United States Patent
Peshkin et al.

(10) Patent No.: US 6,868,746 B1
(45) Date of Patent: Mar. 22, 2005

(54) METHOD AND APPARATUS FOR FORCE SENSORS

(75) Inventors: Michael A. Peshkin, Evanston, IL (US); William Andrew Lorenz, Evanston, IL (US)

(73) Assignee: Northwestern University, Evanston, IL (US)

( * ) Notice: Subject to any disclaimer, the term of this patent is extended or adjusted under 35 U.S.C. 154(b) by 0 days.

(21) Appl. No.: 09/307,357

(22) Filed: May 7, 1999

(51) Int. Cl.[7] .............................................. G01D 1/00
(52) U.S. Cl. ............................................... 73/862.53
(58) Field of Search ...................... 73/862.53; 463/38; 434/45; 345/167, 161

(56) References Cited

U.S. PATENT DOCUMENTS

| | | | | |
|---|---|---|---|---|
| 5,129,265 A | * | 7/1992 | Bartels et al. | 73/862.044 |
| 5,451,852 A | * | 9/1995 | Gusakov | 318/611 |
| 5,555,004 A | * | 9/1996 | Ono et al. | 345/161 |
| 5,831,554 A | * | 11/1998 | Hedayat et al. | 341/20 |
| 5,973,471 A | * | 10/1999 | Miura et al. | 318/640 |
| 6,004,134 A | * | 12/1999 | Marcus et al. | 434/45 |
| 6,033,309 A | * | 3/2000 | Couch et al. | 463/38 |
| 6,285,356 B1 | * | 9/2001 | Armstrong | 345/167 |

FOREIGN PATENT DOCUMENTS

| | | | | | |
|---|---|---|---|---|---|
| JP | 411259228 | * | 2/1998 | | G06F/3/033 |
| JP | 11259228 A | * | 9/1999 | | G06F/3/033 |

* cited by examiner

*Primary Examiner*—Edward Lefkowitz
*Assistant Examiner*—Jewel V. Thompson
(74) *Attorney, Agent, or Firm*—Pillsbury Winthrop LLP

(57) ABSTRACT

The present invention relates to the design and use of multi-axis force sensors for applications such as human-robot interaction. A compliant and easily constructed flexure element for use in controlling the range of motion of a force sensor in response to applied forces and torques is presented. Two- and three-axis embodiments of the flexure element are disclosed. Devices and methods for reading out the deflection of the flexure element to determine an applied force along a single axis are presented as well. The read-out mechanism can employ optoelectronic measurement devices and methods. The optoelectronic sensor can be implemented with the two- or three-axis embodiment of the flexure element. Additionally, a force sensor based on an inductive read-out technique is presented. The described inductive sensor uses the two-axis flexure element.

20 Claims, 7 Drawing Sheets

METHOD AND APPARATUS FOR FORCE SENSORS

FIELD OF INVENTION

The present invention relates to the design and use of force sensors for industrial applications. More particularly, the present invention is directed to methods and systems for measuring input control forces such as those utilized in interactive human-robot applications.

BACKGROUND OF THE INVENTION

Force sensors are typically used in industrial applications to measure applied forces. Force sensors that are suitable for industrial applications such as in robot end-effectors or machining stations are typically based on strain gauges and may be very expensive. While the strain gauge elements themselves may not be expensive, the difficulty of applying and calibrating strain gauges in force sensor applications results in costly devices. These types of force sensors based on conventional strain gauges designed for use in industrial applications, however, are overdesigned for use in measuring human inputs and may be unnecessarily costly. As such, the requirements for these conventional force sensors are unnecessarily stringent for devices used in other applications, such as for interactive human use.

In addition, industrial force sensors are also very rugged and stiff such that applying a force to them causes little or no perceptible deflection. In the case of a conventional strain-gauge sensor, the force to be measured is applied to a very stiff flexure element that causes only an extremely tiny deflection. The flexure may be a rigid beam and to the human eye it may not appear to deflect at all. The strain gauge bonded to the flexure, however, is incredibly sensitive to tiny changes in its length, and although the flexure beam does not bend visibly, the strain gauge nevertheless tells how much deflection has occurred. The amount of deflection is proportional to the force is being applied.

Many different types of industrial machinery and robotic devices are interactively controlled by a human operator. Typically, the human operator manually manipulates a set of controls that indicate to the machine or robotic device the movements desired by the operator. By sensing the operator's manipulation of the controls, the machine determines the operator's intent in moving the device and can implement the desired action.

In general consumer applications such as with computer video games, a handheld joystick is commonly utilized as a user input control device. A joystick typically measures the changes in position of the joystick handle and translates the positional information into a data signal format that can be transmitted to the digital computer. A typical joystick, however, is not rugged or reliable enough to be utilized in an industrial application where the device may become damaged through constant handling and use. The reliability of the control device is also an important factor in an industrial application where a failure of the joystick may result in the loss of control of machinery that may cause an accident and injure nearby personnel or workers.

Needed are human-operated control devices that are rugged enough for industrial applications, yet are not prohibitively expensive.

SUMMARY OF THE INVENTION

In accordance with preferred embodiments of the present invention, some of the problems associated with using force sensors for human/robot interaction are addressed and overcome.

It would be desirable to provide a multi-axis force sensor that is affordable to purchase, maintain, or replace. Preferably, the multi-axis force sensor is relatively easy to construct, fabricate, and/or machine. Further, the sensor must offer a sufficient level of force measurement accuracy and performance as required by the desired application.

It would be desirable to provide a multi-axis force sensor for use in human-robot interaction, to present an interface to a user that is suitably compliant for use by a human operator. Preferably, the multi-axis force sensor is durable and rugged enough to withstand the rigors of repeated use in industrial or other work or research environments.

In accordance with these desired characteristics of force sensors, methods and devices directed to non-contact, multi-axis, force sensors are presented.

According to an aspect of the invention, a flexure element designed for use in a force sensor provides a rugged and durable device having a response to applied forces that is suitably compliant for a human operator. The dimensional properties of the flexure element are chosen to allow compliance to forces directed along an axis and to simultaneously resist or minimize compliance to forces directed along other axes and to rotational forces or torques about all axes. The materials and dimensional characteristics for the flexure element are chosen to satisfy a variety of criteria, including linearity, elasticity and compliance, durability, strength, ease of fabrication and construction/machining, and resistance to breaking of fatigue due to deflection.

According to one embodiment, the flexure element consists of four "L"-shaped strips of material. These strips of materials may be adapted to be fastened together to form a flexure having a substantially square shape.

In accordance with yet another embodiment of the invention, the flexure is positioned between a first member and a second member. Applying a force to a handle or graspable interface connected to the first member moves the first member relative to the second member according to the compliance of the supporting flexure. In one particular embodiment, the first and second members are shaped to allow controlled movement along different directions. The movement of the first member is constrained by the compliance of the flexure and the distance between the first member and the second member. The degree of movement or displacement of the first member relative to the second member is a function of the applied force.

According to another embodiment of the invention, a three-axis or three-dimensional force sensor is presented using flexure elements for each of the three axes. These elements are compliant to applied forces along each of three axes, x, y, and z.

According to yet another embodiment, the applied force is determined from the displacement of the first member relative to the second member or the deflection of the flexure, via a readout mechanism or technique to yield a two-axis force sensor. The force measurements along each axis are independent of each other, and the readout mechanism outputs values specific to each axis.

Another embodiment according to another aspect of the invention uses an optoelectronic technique to determine the force applied to a force sensor. This embodiment employs a non-contact optical sensor that determines the displacement (controlled via the flexure element) of the first member relative to the second member, which in turn corresponds to an applied force to the handle. The optoelectronic sensing circuitry provides an output voltage that is proportional to the applied force. In a preferred embodiment, the optoelectronic technique comprises mounting a light-emitting source such as a light-emitting diode (LED) and stabilization circuitry with a photodiode on a printed circuit. Stabilization circuitry controls noise and drift and provides a substantially constant light source that reflects against an inward-facing wall of the second member. As the first member moves relative to the second member, a reverse-biased photodiode receives more or less reflected light from the LED. The photocurrent generated in the photodiode is subtracted from the photocurrent of a similar photodiode diametrically opposite, and is amplified to arrive at a readout output voltage that provides a measure of the deflection, displacement, and thus the applied force.

Still another embodiment of the invention employs electromagnetic inductive techniques to determine the forces applied to a force sensor. Voltages are magnetically induced in a pattern of wires or traces according to the relative displacement of the wires as controlled by the flexure element, to provide a force sensor. Preferably, the pattern of wires is such that when no force is applied, the wires are situated relative to each other so that no voltage is output. When the patterns of wires move relative to each other, voltages are induced in the wires and a non-zero output voltage is produced.

The embodiments of the present invention provide many advantages in implementing force sensors for measuring applied forces including control inputs from a human operator. The described embodiments provide a force sensor for an input control device having appropriate compliance for a human operator manipulating the control device. In addition, using optical or inductive displacement and force sensing methods allows the isolation of forces along different axes. The force sensor of the described embodiments also provide a reliable and accurate, yet affordable system for implementing an input control device for human/robot interaction. The force sensor can be utilized in a wide variety of applications including human-robot coordination, teleoperation, and collaborative robots and other applications requiring forces to be measured.

The invention is not limited to the illustrative described embodiments. The foregoing and other features and advantages of a preferred embodiment of the present invention will be more readily apparent from the following detailed description, which proceeds with references to the accompanying drawings.

BRIEF DESCRIPTION OF THE DRAWINGS

Preferred embodiments of the present invention are described with reference to the following drawings, wherein.

DETAILED DESCRIPTION OF PREFERRED EMBODIMENTS

Figure 1:
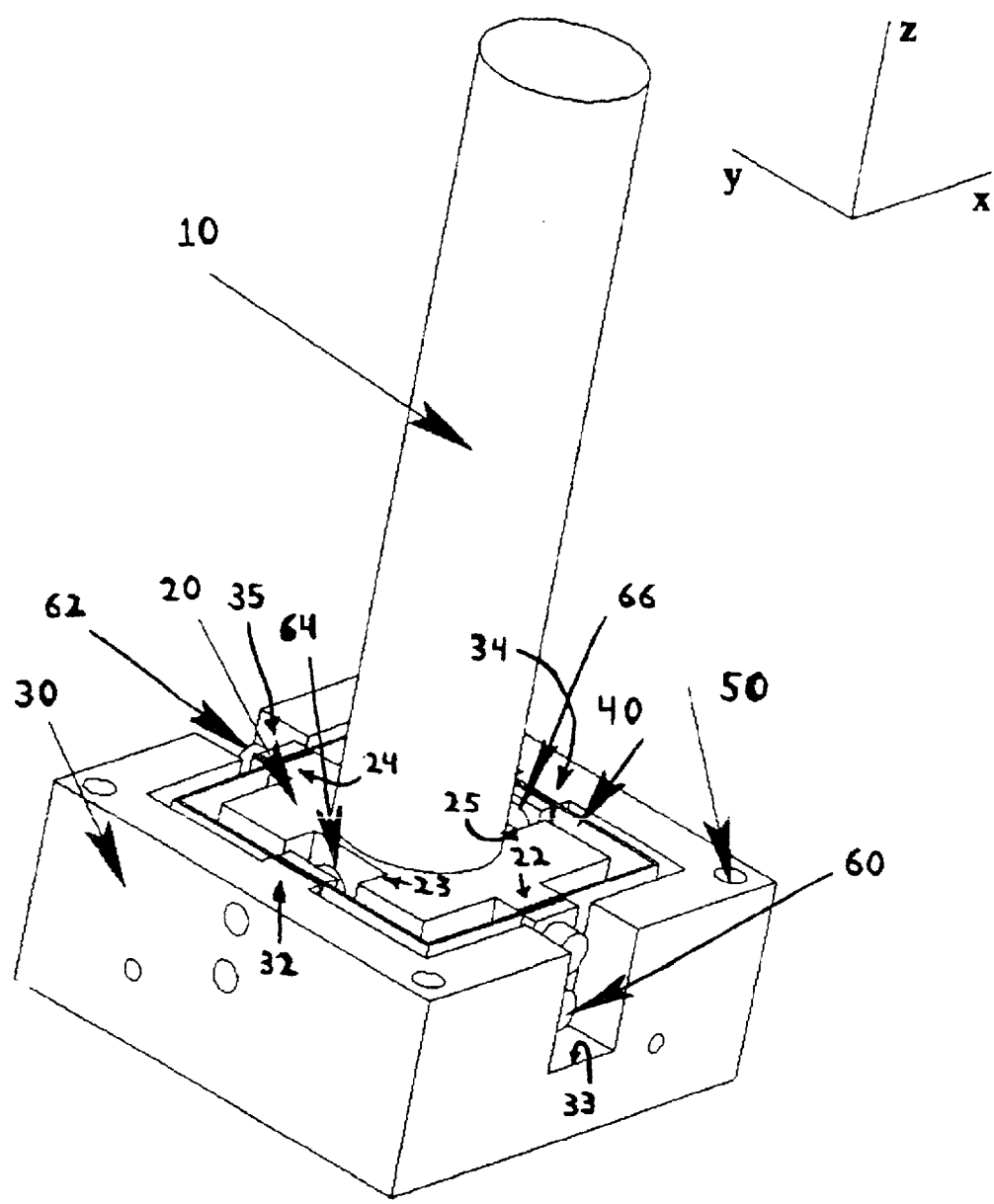
FIG. 1 shows a perspective view of an illustrative multi-axis force sensor utilizing a flexure.

Presented in FIG. 1 is a perspective view of a preferred embodiment of a force sensor used to measure forces applied along different directional axes. The preferred embodiment is particularly designed to accommodate manual control input from a human operator.

Generally, a force has a magnitude and direction in a three-axis (x, y, z) coordinate system that can be resolved into mutually orthogonal components of component magnitudes along each of the respective x and y and z axes ($f_x$, $f_y$, and $f_z$). Forces applied to a sensor device range from forces along only one axis (x, y, or z), to those along a plane or two axes (x-y, y-z, x-z), up to three-dimensions (six axes, including forces $f_x$, $f_y$, and $f_z$ and torques $\tau_x$, $\tau_y$, and $\tau_z$). A multi-axis force sensor is used to measures forces applied over more than one axis.

Shown in FIG. 1 is an embodiment of the two-axis force sensor including a first member 20, and second member 30, and a flexure 40 positioned between the first member 20 and the second member 30. For purposes of the following exemplary embodiments, the first member 20 is preferably an inner member 20 while the second member 30 is preferably an outer member 30. This exemplary embodiment and associated preferred embodiments are for illustrative purposes and the invention is not limited as to which of the first or second member is the inner or outer member. Moreover, the first and second members may be arranged in other configurations. The first member could be positioned below, above, within, outside, nearby, or adjacent to the second member, although for purposes of the exemplary embodiment illustrated in FIG. 1, the first, inner member 20 is positioned within the second, outer member 30.

Applying a force to the handle 10 connected to the inner member 20 moves the inner member 20 relative to the outer member 30 as controlled by the flexure 40 of FIG. 1. In one particular embodiment, the inner and outer members 20, 30 are configured to allow a limited displacement between the inner and outer members 20, 30 along the x-axis and the y-axis directions. The amount or degree of displacement or movement of the inner member 20 relative to the outer member 30 along an axis is a function of the applied force as will be described in more detail below.

The movement of the inner member 20 relative to the outer member 30 is constrained by the physical compliance of the flexure 40 and ultimately the mechanical clearance between the inner member 20 and the outer member 30. In a preferred embodiment, this distance may be on the order of one millimeter (1 mm) or several millimeters. Of course the invention is not limited to this displacement and the distance between the inner member 20 and the outer member 30 may vary, for instance, according to the particular application and to the dimensions of the members in a particular design.

The preferred embodiment of the force sensor is designed to be particularly suited to measuring forces manually imparted by a human operator to the handle 10. It should be understood, however, that the present embodiment can also be used in a variety of different configurations or with other mechanical assemblies to measure applied forces. In this embodiment suitable for manual use by a human operator, forces are applied to the graspable handle 10. Although the handle 10 in this embodiment is shown to be a cylindrical member, the handle 10 can be any graspable interface capable of accepting movement from a user or a user's hand. Preferably, the handle 10 is formed of a durable metal, wood, graphite composite, etc. and may be covered with an appropriate rubber grip to avoid slippage.

In this embodiment, the handle 10 is shown as mounted onto the inner member 20. It should be understood that the handle 10 may be connected to either the first (here inner) member 20 or second (here outer) member 30 as will be apparent to those skilled in the art. The graspable handle 10 can be a separate component fixably mounted to the inner member 20 through a variety of means including rivets, joints, fasteners, screws, bolts or adhesives as well known to those skilled in the art. The handle 10 can also be integrally formed with the inner member 20. The handle 10 can also be attached to the outer member 30 in other embodiments (not shown in FIG. 1) to move the outer member 30 with respect to the inner member 20.

In this embodiment, the inner member 20 is suspended within an outer member 30 by a flexure element 40. The flexure element 40 is flexible enough to allow a relative displacement to occur (when a force is applied to the handle 10) between the inner member 20 to which the handle 10 is mounted and an outer member 30. The inner member 20 can move as guided by the handle 10 with respect to the outer member 30 within the mechanical constraint allowed by the flexure 40 and the physical clearance between the inner and outer members 30. In a particular embodiment, the handle 10 may be allowed to move less than one millimeter (1 mm). In this embodiment, handle 10 provides a movable yet durable and not overly stiff control interface for a human user.

More generally, the graspable handle 10 can be attached, mounted, or connected to either the first (here inner) member 20 or the second (here outer) member 30 so the flexure 40 that supports the members 20, 30 can be directed via handle 10 to allow one member to move relative to another member along two axes.

Most generally, it should be understood that FIG. 1 is an exemplary embodiment of a two-axis force sensor. A myriad of possibilities of arrangements of the first member, second member, the handle, and the flexure exist and will be apparent to those skilled in the art. Varieties of positioning or different attachment strategies are envisioned, including with respect to the interaction between the first and second member and the direction of one or both by the handle. One preferred embodiment to utilize many of the preferred attributes of the different strategies of positioning and interaction is the two-axis force sensor of FIG. 1.

Preferably, the outer member 30 of FIG. 1 may also serve as a mounting, base or housing for the force sensor. A plurality of mounting holes 50 is provided for the outer member 30 to connect or mount the force sensor to other equipment or devices. Of course, the force sensor of FIG. 1 can be implemented as a stand-alone device without a plurality of mounting holes 50.

In the preferred embodiment shown in FIG. 1, the flexure 40 is mounted to the outer member 30 and inner member 20 by fasteners 60, 62, 64, 66. For example, the flexure 40 is fastened to the outer member 30 via fasteners 60, 62. The fasteners 60, 62 connect the flexure 40 to the outer member 30 and fasteners 64, 66 connect the flexure 40 to the inner member 20. In this manner, the flexure 40 suspends the inner member 20 within the outer member 30 and allows movement of the inner member 20 within the outer member 30. The fasteners 60, 62, 64, 66 may be implemented in a variety of was such as pairs of rivets, screws, bolts, adhesives, welds, etc. Additionally inner member 20, flexure 40, and outer member 30 may be fabricated as a single unit by molding, machining, casting, forginig, etc., thus avoiding the need for fasteners.

As shown in FIG. 1, the inner member 20 and the outer member 30 include raised sections 22, 24, 32, 34 that are formed as raised or standoff sections to receive the fasteners 60, 62, 64, 66 that secure the flexure 40 in place between the inner and outer members. The sections 22, 24, 32, 34 are preferably formed as raised standoff sections to create clearance between the inner 20 and outer member 30 to allow for movement and deflection of the inner member 20 relative to the outer member 30. The height of the raised standoff sections 22, 24, 32, 34 and the clearance provided between the inner 20 and outer member 30 depends on the desired amount of displacement of the handle 10 and the inner member 20 as can be determined by those skilled in the art. In a particular embodiment, the height of the raised standoff is approximately equal to the displacement desired by the inner member 20.

Preferably, the inner and outer members 20, 30 are also formed with corresponding relieved recesses, channels, or slots 23, 25, 33, 35 opposite the standoff sections 22, 24, 32, 34. The relieved sections 22, 24, 32, 34 provide additional clearance for the raised standoff sections 22, 24, 32, 34 to allow movement of the inner member 20 with respect to the outer members 30. For example, when the handle 10 and inner member 20 are moved along the x-axis direction, the standoff sections 32, 34 formed in the outer member 30 may be displaced into the recessed channels 23 or 25 formed in the inner member 20. Similarly, the outer member 30 also includes slots or channels 33, 35 which receive the raised sections 22, 24 of the inner member 20 during displacement of the inner member 20 relative to the outer member 30 in the y-axis direction. By appropriately providing such raised and relieved sections, clearance for displacement of the movement of the inner 20 and outer members 30 can be created.

In this embodiment of the invention, the flexure element 40 that supports the inner member 20 within the outer member 30 is preferably made of a deformable material that is formed to dimensions capable of allowing the flexure 40 to provide a desired mechanical deflection. The mechanical deflection of the flexure 40 preferably allows the inner member 20 to move relative to the outer member 30 along the two axes, x and y in FIG. 1. In the preferred embodiment, the flexure 40 is designed so that it does not bend significantly in response to applied forces in the z-direction or to torques about the x and y axes. The particular choice of materials for the flexure and the dimensional characteristics of the flexure in this exemplary embodiment will be described in more detail with respect to FIGS. 2 and 3.

In the two-axis sensor shown in FIG. 1, the applied force imparted to the handle 10 may be determined from the displacement or deflection of the inner member 20 relative to the outer member 30 via a readout mechanism or technique to yield a two-axis force sensor. For example, the force sensor may include a readout mechanism to measure the displacement of the inner member 20 in the direction along each axis. The different force measurements along each axis are independent of each other and each readout mechanism or technique outputs a deflection value unique for each axis. Exemplary readout mechanisms are described in more detail with reference to FIGS. 5–7.

In a further embodiment described in more detail later, one or more printed circuit boards ("PCBs") (not shown in FIG. 1) are also positioned on or adjacent to the inner member 20 to detect the relative displacement of the inner member 20 with respect to the outer member 30. Preferably, the PCB includes an electronic sensor circuit to detect the relative motion of the inner and outer members 20, 30. The sensor circuit can be used to measure the displacement, as allowed by the flexure 40, of the inner member 20 relative to the outer member 30 in response to an applied force at the handle 10, as will be further described herein.

Figure 2:
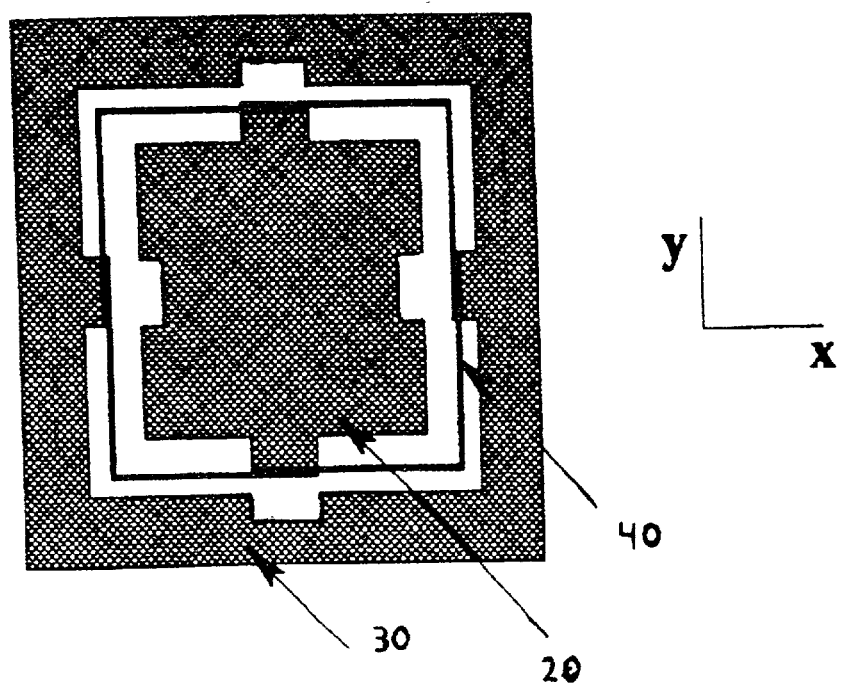
FIG. 2 shows a top internal view of a multi-axis force sensor showing the flexure utilized in the force sensor of FIG. 1.

FIG. 2 is a top internal or cross-sectional view of a multi-axis force sensor of a roughly similar construction to that of FIG. 1. The flexure 40 supports and suspends the inner member from the outer member 30 and is positioned therebetween. In an exemplary embodiment, the flexure 40 is designed to allow in the range of one millimeter of displacement along each axis or motion between the inner member 20 and the outer member 30. To limit the travel of the inner member at this desired amount of deflection, the inner member 20 and the outer member 30 may be designed to physically make contact with each other at this displacement, thus preventing any further relative motion between the members. The desired physical clearance can be obtained by choosing the dimensions of the raised standoff sections previously described above to create the desired clearance between the inner and outer members 20, 30. In addition, the flexure 40 is constrained from deflecting beyond this point as well, and thus the flexure 40 is protected from excessively large deflections or stretching that might cause breakage of or fissure in the flexure 40. Alternatively, the flexure 40 may be chosen to have a compliance such that it limits the travel of the inner member 20 before the inner member 20 is physically prevented from further movement by the outer member 30. The flexure 40 may be chosen of a material or dimension to allow only a limited travel of the inner member 20 as described in more detail below.

Figure 3:
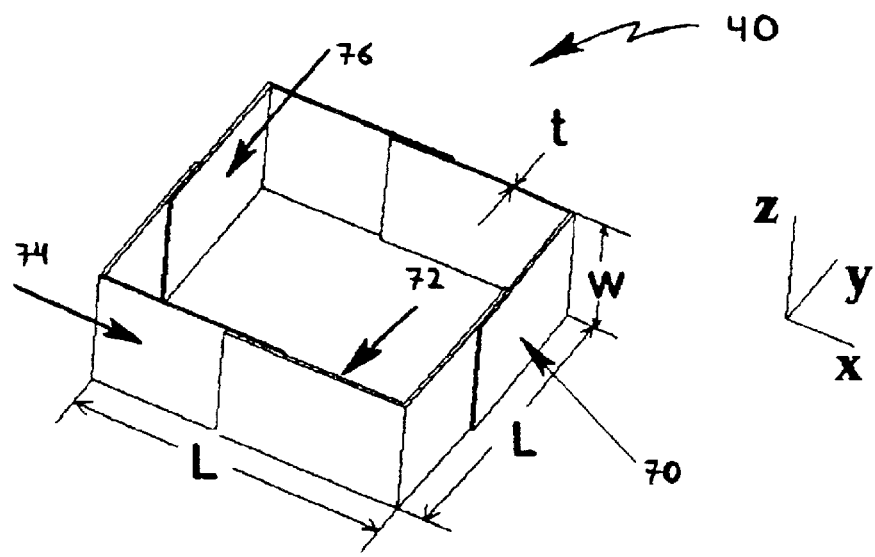
FIG. 3 is a perspective view of the flexure detailing particular aspects of the flexure elements making up the flexure of FIG. 2.

FIG. 3 is a perspective view showing a particular construction of flexure 40 including its particular dimensional properties. In a preferred embodiment of the flexure 40, the flexure 40 is formed of four rectangular-shaped strips of material 70, 72, 74, 78. The flexure 40 is shown to have dimensions of length L, height or depth w, and thickness t. In this embodiment, each of the strips of material 70, 72, 74, 78 forming the flexure 40 are formed into "L"-shaped strips of material with a right-angle bend at about the half the length of each strip. As will be apparent to those skilled in the art, each of the strips of material 70, 72, 74, 78 forming the flexure 40 are of a length greater than L, or have a length L+O (L plus Overlap).

As shown in FIGS. 1 and 3, the intersection of each of the strip sections 70, 72, 74, 78 overlap one another and are fastened to the respective inner and outer members 20, 30 through the overlapped strip sections. The particular dimensions of length L, thickness t, and height or depth w, of the rectangular strip flexure 40 shown in FIG. 3 affect the compliance of the flexure 40 in response to applied forces and torques. As noted above with reference to FIG. 1, the flexure 40 is preferably designed to significantly resist deflections in the z direction (in response to an up-or-down applied force on the handle 10, for example) or to torques $\tau_x$ and $\tau_y$, about the x and y axes, respectively. The described rectangular strip flexure 40 can be used effectively for this purpose. The flexure 40 may also take on other shapes, with different dimensional properties than that illustrated in FIG. 3. For example, the flexure 40 may be of a circular, triangular, pentagonal, hexagonal or other geometric shape, or constructed of one single piece of material, rather than the four "L"-shaped flexure elements of FIG. 3. As will be apparent to those skilled in the art, springs or elastic materials may also be chosen to be suitably compliant to provide the desired compliance and displacement between the inner and outer members 20, 30.

The compliance and material properties of flexure 40 of FIG. 3 are described herein. The shape of the square flexure 40 can be used to determine its compliance matrix C assuming small deflections and simple stress distributions within the cross-section of the flexure element. The compliance matrix A for single "L" shaped element of the flexure elements 70, 72, 74, 76 that make up the square-shaped flexure 40 of FIG. 3 is shown below in equation (1):

$$A = \begin{pmatrix} 2 & -\frac{3}{4} & 0 & 0 & 0 & -\frac{9}{4} \\ -\frac{3}{4} & \frac{1}{2} & 0 & 0 & 0 & \frac{3}{4} \\ 0 & 0 & p+\frac{3}{8}k & \frac{3}{4}p+\frac{3}{8}k & -\frac{3}{4}p & 0 \\ 0 & 0 & \frac{3}{4}p+\frac{3}{8}k & \frac{3}{2}p+\frac{3}{8}k & 0 & 0 \\ 0 & 0 & -\frac{3}{4}p & 0 & \frac{3}{2}p+\frac{3}{8}k & 0 \\ -\frac{9}{4} & \frac{3}{4} & 0 & 0 & 0 & 3 \end{pmatrix} \quad (1)$$

where p represents the aspect ratio and is equivalent to $$p = \frac{t^2}{w^2};$$

and k represents the ratio of the modulus of elasticity E and the modulus of rigidity G of the material, or $$k = \frac{E}{G}.$$

The displacment $\Delta \bar{x}$ of a single "L" shaped element of the flexure elements 70, 72, 74, 76 in response to an applied force $\vec{f}$ is given by equation (2):

$$\Delta \bar{x} \equiv \begin{pmatrix} \Delta x \\ \Delta y \\ \Delta z \\ \Delta \theta_x \\ \Delta \theta_y \\ \Delta \theta_z \end{pmatrix} = \frac{L^3}{Et^3 w} A \begin{pmatrix} f_x \\ f_y \\ f_z \\ \tau_x \\ \tau_y \\ \tau_z \end{pmatrix} \equiv \frac{L^3}{Et^3 w} A \vec{f} \quad (2)$$

where $\Delta \bar{x}$ is the displacement vector (with translational as well as rotational displacements), L is the length of one side of the square material sheet (the flexure 40), E is the modulus of elasticity, t is the thickness of the material, w is the height or depth of the material, h is the height of the material, and $\vec{f}$ is the applied force vector.

These compliance matrices A are translated and rotated so that they are positioned as in FIG. 3. Then the compliance matrix, C, is found by combining these four matrices by the following equation (3):

$$C = \left( \sum_i A_i^{-1} \right)^{-1} \quad (3)$$

Performing the operations on the compliance matrices A results in the following expression for the compliance matrix C of the flexure 40 of FIG. 3:

$$C = \begin{pmatrix} \frac{1}{20} & 0 & 0 & 0 & 0 & 0 \\ 0 & \frac{1}{20} & 0 & 0 & 0 & 0 \\ 0 & 0 & p\frac{k+p}{4(k+4p)} & 0 & 0 & 0 \\ 0 & 0 & 0 & p\frac{3(k+p)(k+4p)}{12k^3+80kp+40p^2} & 0 & 0 \\ 0 & 0 & 0 & 0 & p\frac{3(k+p)(k+4p)}{12k^3+80kp+40p^2} & 0 \\ 0 & 0 & 0 & 0 & 0 & \frac{3}{112} \end{pmatrix} \quad (4)$$

where, as before, p represents the aspect ratio and is equivalent to $$p = \frac{t^2}{w^2};$$

and k represents the ratio of the modulus of elasticity E and the modulus of rigidity G of the material, or $$k = \frac{E}{G}.$$

The displacement $\Delta\bar{x}$ of the flexure 40 of FIG. 3 in response to an applied force $\vec{f}$ is given by equation (5):

$$\Delta\bar{x} = \frac{L^3}{Et^3w}C\vec{f} \quad (5)$$

Those of skill in the art will gain a number of insights from this compliance matrix C. First, the matrix is diagonal, indicating that the forces $f_x$, $f_y$, and $f_z$ and torques $\tau_x$, $\tau_y$, and $\tau_z$ create only their corresponding motions and do not affect other motions. This is clear in view of the symmetry of the "L" shaped flexure elements 70, 72, 74, 76 that make up the square-shaped flexure 40 of FIG. 3. The matrix also shows how the choice of aspect ratio parameter p affects the design. If p is small, as in the preferred embodiment, then the flexure 40 moves significantly only in response to the forces $f_x$, $f_y$, and $\tau_z$. If p is large, however, then the flexure 40 responds to $f_z$, $\tau_x$ and $\tau_y$. Overall, the compliance matrix shows how the dimensions of the flexure 40, length L, thickness t, and height or depth w, affect the response of the flexure 40.

As can be seen by those of skill in the art, the height or depth w and thickness t of the flexure 40 are determinative of the flexure's 40 relative response to forces along an axis and planar torques. In this embodiment, a typical value for the aspect ratio of the width or height w to the thickness t of the flexure 40 of FIG. 3 is approximately 30:1 in the preferred embodiment of the square flexure 40.

Preferably, the flexure 40 is capable of deflecting a desired distance, $x_d$ when the full scale force F is applied in the x (or y) direction. In addition, the flexure 40 must be resilient and not break or otherwise become permanently deformed or fatigued at this deflection. The deflection as a function of force F can be obtained from equation (5). It is:

$$x_d \equiv \Delta x = \frac{1}{20}\frac{FL^3}{Et^3w} \quad (6)$$

where $F=f_x$ from equation (1). The maximum moment $M_{max}$, can be found via mechanics of materials type analysis as known in the art, and is related to the applied force F as shown in equation (7):

$$M_{max} = \frac{3}{40}FL \quad (7)$$

The moment of inertia, I, of the flexure 40 when bent or twisted about the z-axis is:

$$I = \frac{1}{12}wt^3 \quad (8)$$

Preferably, the maximum stress $\sigma_{max}$ should be a factor of safety less than the yield stress $\sigma_y$. The equation for the maximum stress $\sigma_{max}$ is then:

$$\sigma_{max} = \frac{M_{max}c}{I} = \frac{9}{20}\frac{FL}{wt^2} < \frac{\sigma_y}{F.S.} \quad (9)$$

where $c=t/2$ is the maximum distance from the normal axis of the flexure;

$\sigma_y$ is the yield stress; and

F.S. is the factor of safety desired. From equations (6) and (9), restrictions on the length L and the thickness t of the material can be found:

$$L < \frac{9}{\sqrt[3]{20}}\frac{(F.S.)x_d^{2/3}F^{1/3}}{w^{1/3}}\frac{E^{2/3}}{\sigma_y} \quad (10)$$

$$t = \sqrt[3]{\frac{F}{20x_dEw}}L \quad (11)$$

Preferably, the sensor is constructed to be as small as is possible. This implies minimizing the L dimensional component. A proper choice of material will minimize $E^{2/3}/\sigma_y$, or will maximize $$\frac{\sigma_y^{3/2}}{E},$$

the material factor of equation (10).

Certain materials score well by this criterion of maximizing $$\frac{\sigma_y^{3/2}}{E}.$$

One is high tensile strength steel, such as the "spring steel" in the preferred embodiment. Other materials that score highly are certain plastics and rubbers. The rubbers are a less desirable material, as the thickness, t, is typically so large as to make the design unfeasible, but nylon or other plastics are possible alternatives. In the current embodiment, spring steel has good fatigue properties (when a factor of safety F.S. of 2 or greater is used) particularly when viewed relative to most plastics. Spring steel, however, may be difficult to machine and bend, as its hardness is similar to that of machine tools and it is rather brittle outside its elastic range.

Figure 4:
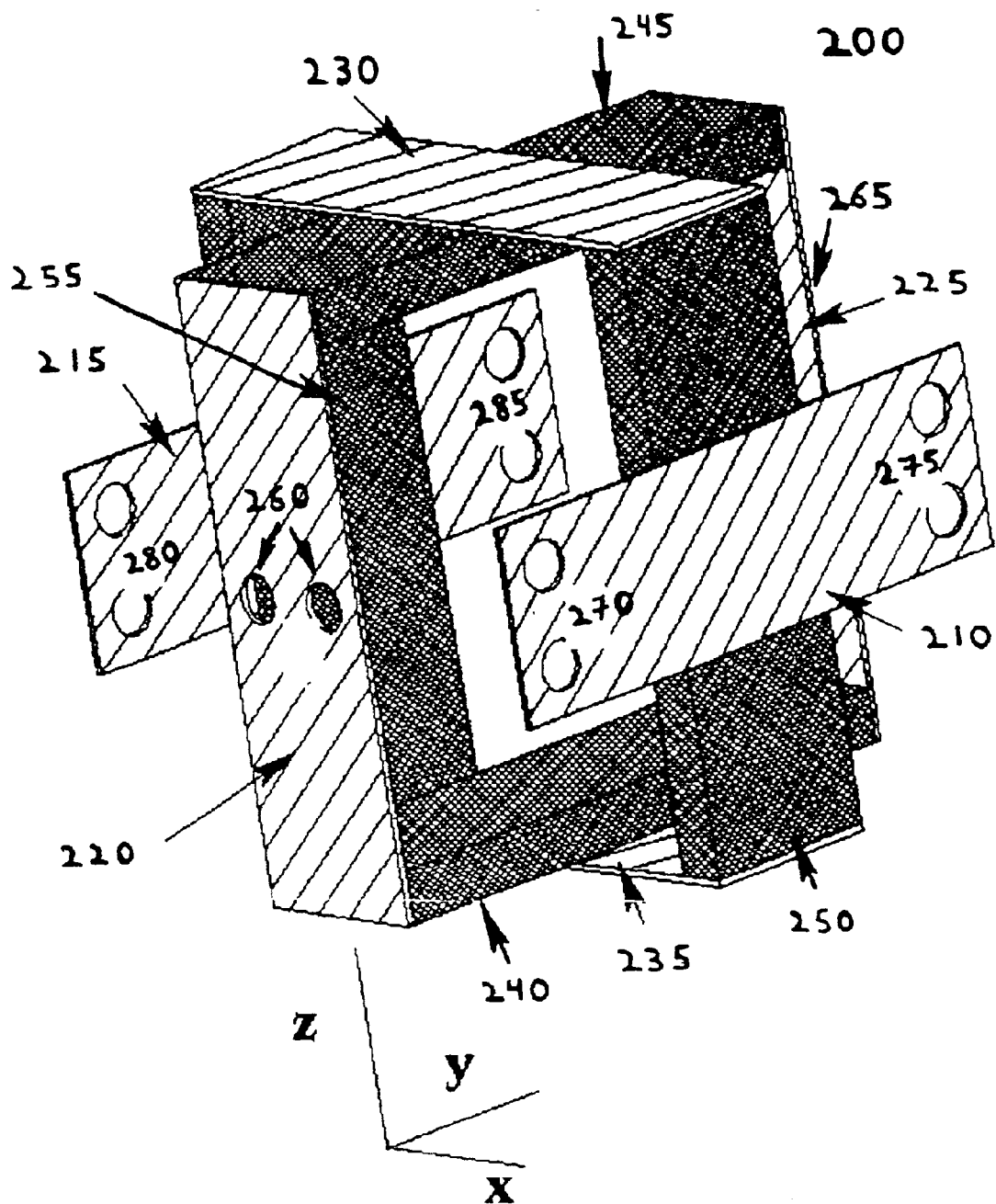
FIG. 4 is a simplified perspective view of another embodiment of a multi-axis force sensor providing a three-axis force sensor.

Shown in FIG. 4 is another embodiment of a flexure 200 capable of measuring forces along three axes to implement a three-dimensional force sensor. This particular embodiment of the flexure 200 is intended to direct applied forces along three independent component axes, while resisting large twists, rotational forces, or torques about these axes. In this embodiment, three pairs of flexure strips 210, 215; 220, 225; and 230, 235 are positioned along each of the three axis to cooperatively allow displacement in the x, y, and z directions respectively. Rigid beam pairs 240, 245; and 250, 255 (represented by darker shading in FIG. 4) are connected at their ends and centers to the flexure beam pairs 210, 215; 220, 225; and 230, 235 as shown in FIG. 4. The rigid beam pairs 240, 245; and 250, 255 are preferably of rigid boxed section construction to resist bending or deflection. Of course, the rigid beam pairs may also take other forms such as an I-beam type construction to provide resistance to deflection and good strength to weight ratio. This resistance to deflection serves to eliminate rotational forces as noted above.

Each of the flexure strip pair 220, 225 has a pair of mounting points or attachment holes 260, and 265, respectively (pair 265, located on flexure strip 225, is hidden from view but is similarly positioned to pair 260, located on 220.) Each flexure strip of the flexure strip pair 210, 215 includes two pairs of attachment holes 270, 275; and 280, 285, respectively at the ends of each flexure. The attachment holes or positions can be utilized to position and mount the flexure to devices and mechanical assemblies from which applied forces are to be measured. For example, an embodiment of a three-dimensional force sensor using the flexure 200 may have an additional housing or base outer member (not shown in FIG. 4) that the flexure 200 can be attached to through mounting points 270, 275, 280, 285. A moveable inner member of handle (not shown) may be attached to mounting points 260, 265 to input forces to the flexure 200. As suggested by the configuration of the flexure 200, the handle or inner member may be a yoke or "Y" shaped member in order connect to the flexure 200.

Preferably, each of the flexure strip pairs 210, 215; 220, 225; and 230, 235 allows motion and displacement in one coordinate axis direction. Each of the flexure strip pairs 210, 215; 220, 225; and 230, 235 respond to forces applied in the x, y, and z directions, respectively. For example, if a force having only an x direction component is applied, only the flexure strip pair 210, 215 will respond and bend to allow the flexure 200 to move in the x-axis direction, without a corresponding movement of the other flexure strip pairs 220, 220; 230, 235. If an applied force is applied in the y direction, only the flexure strip pair 220, 225 responds to allow motion in the y-axis direction. Similarly, if a force is applied in the z-axis direction, only flexure beam pair 230, 235 responds. In most instances, the applied force may have a directional component along each of the x, y, and z coordinate axes, causing each of the flexure strip pairs 210, 215; 220, 225; and 230, 235 to respond accordingly.

In a specific embodiment of the flexure 200 of FIG. 4, an applied force is determined from the displacement along each axis of the inner member relative to the outer member or the deflection of the flexure 200, via a readout mechanism along each of the three axes of the force sensor. The force measurements along each axis are independent of each other and the readout mechanism or technique outputs values unique to each axis.

Figure 5:
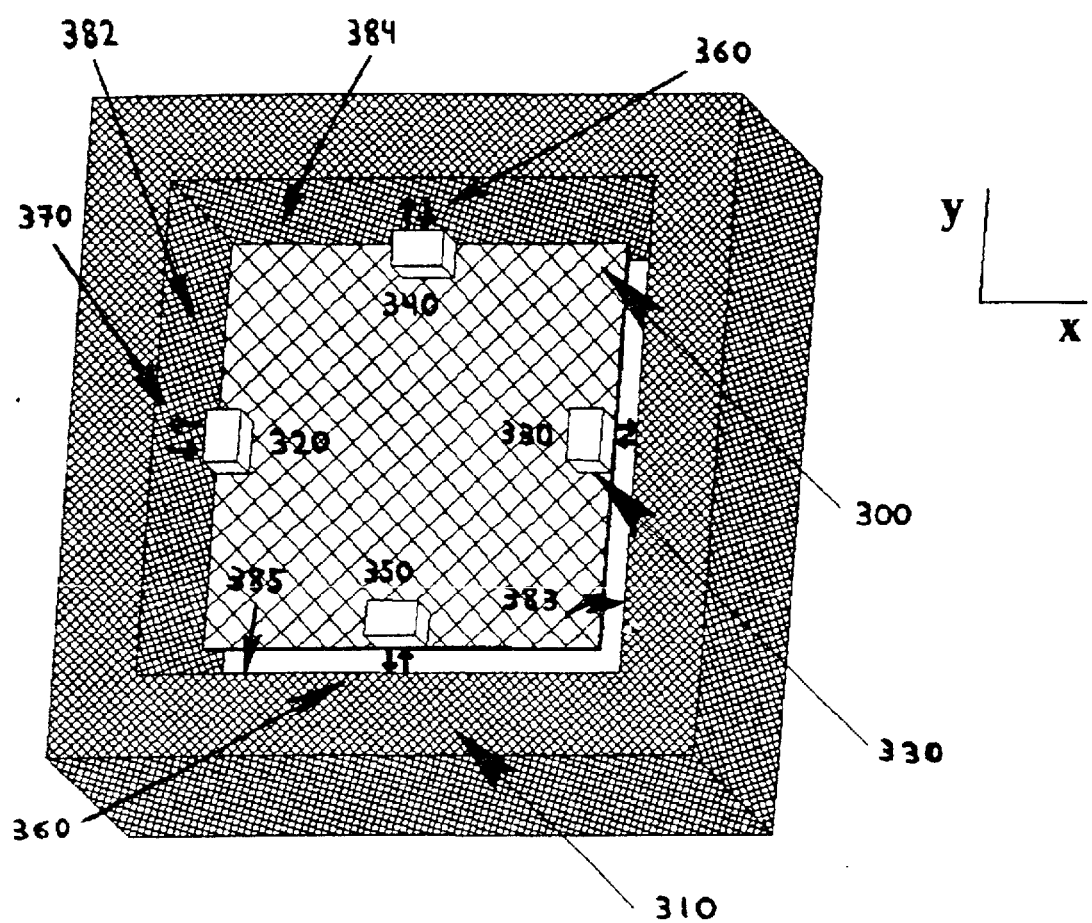
FIG. 5 is a simplified perspective view of an illustrative arrangement of sensors on a printed circuit board (PCB) that can be used in the force sensor of FIG. 1.

Shown in FIG. 5 is an embodiment using an optoelectronic readout mechanism to determine the forces that are applied to a force sensor such as the devices described herein. It should be understood that the readout mechanisms described herein may be applied to other types of mechanical flexures. The exemplary embodiment uses the reflective properties of light to provide a non-contact reflective sensor that detects the displacement of the inner member 20 relative to the outer member 30. The displacement of the inner member 20 corresponds to a force applied to the handle 10.

FIG. 5 shows a simplified perspective view of and exemplary embodiment of the optical force sensor utilizing a printed circuit board (PCB) 300 positioned within an outer member 310, similar to the outer member 30 of FIG. 1. The outer member includes inward-facing surfaces 382, 383 (hidden from view), 384, and 385 (also hidden). The PCB 300 is preferably mounted on or attached to an inner member, which is not shown for purposes of clarity of explanation, but may be similar to the inner member 20 of FIG. 1. Preferably, the PCB 300 is centered with respect to the outer member. The PCB 300 thus moves according to the inner member to which it is attached as the inner member moves with respect to the outer member 310. The flexure 40 is also not shown in FIG. 5 for purposes of clarity of explanation of the optical readout mechanism.

In this exemplary embodiment, two optical or "reflective object" sensors 320 and 330 are mounted opposite each other on two opposite edges of the PCB 300 to measure displacement of the inner member with respect to the outer member 310 along the x-axis direction. Similarly, two optical sensors 340 and 350 are also mounted opposite each other on the other two opposite edges of the PCB 300 to measure the displacement of the inner member with respect to the outer member along the y-axis direction. Optical reflective object sensor preferably consist of a light emitting source such as an infrared LED ("IRED") and a phototransistor in a small shared package, both "looking" out the same end of the package. It should be understood that a light emitting source and optical sensor can also be separately provided and combined to form the optical sensor. In operation, the light emitting source emits a light of a constant, uniform amplitude. If there is a reflective surface or object nearby to bounce light back, the emitted light is reflected back to the phototransistor or photodiode that receives and detects the reflected light. The reflected light reaching the phototransistor causes a photocurrent that is proportional to the amplitude of light reaching the phototransistor. The closer the reflective surface is, the greater the generated photocurrent. The further the reflective surface, the less photocurrent is generated as is described further below.

Optical sensors 320, 330, 340, and 350 are positioned opposite to and directed toward inner surfaces 382, 383, 384, and 385, respectively, of the outer member 310. The arrows 360, 370 drawn at the sensors 320, 330, 340, and 350 are intended to represent the path traveled by light emitted by the object sensors 320, 330, 340, and 350 to the inner walls 382, 383, 384, and 385 of the outer member 310 and reflected back again to the sensors 320, 330, 340, and 350.

When the inner member (not shown) similar to inner member 20 (FIG. 1) moves as directed by the handle and allowed by the flexure 40 (not shown) similar to that of FIG. 1, the PCB 300 attached to the inner member approaches an inner wall of the outer member 310. Accordingly, the sensors 320, 330, 340, and 350, mounted on the PCB 300 will approach, moves farther away from, or along the inner walls 382, 383, 384, and 385, respectively, of the outer member 310, depending on the direction of the applied force. In a preferred embodiment of the invention, the sensors 320, 330, 340, and 350 mounted on the PCB 300 are set-off a small distance the from the edge of the PCB 300 to prevent the sensors from coming into physical contact with the inner walls 382, 383, 384, and 385 at the limit of the range its displacement. Alternatively, flexure 40 (not shown) such as described herein is dimensioned to prohibit the PCB 300 and consequently the sensors 320, 330, 340, and 350 mounted on the PCB 300 from contacting the inner walls 382, 383, 384, and 385, respectively, of the outer member 310.

For instance, a force applied only in the positive x-direction causes optical sensor 320 mounted on PCB 300 to move away from inner wall 382, thus causing the optical sensor to detect the decreased proximity of the inner wall 382. Accordingly, optical sensor 330 mounted on the opposite side of PCB 300 will approach inner wall 383 and detect the increased proximity of the sensor 330 to the inner wall 383. Optical sensors 340, and 350 will not detect displacement from the inner walls 384, and 385 as a result of a displacement only in the y-axis direction. As described above, using optical sensors, an increased proximity of an optical sensor to an inner wall results in a greater amount of reflected light from the inner wall to be detected by the optical sensor. The difference in light intensity detected between optical sensors 320 and 330 provides an indication of the relative displacement of the handle or inner member (to which the PCB 300 is affixed) to the outer member 310 as allowed by a flexure. Accordingly, the force applied to the handle in the positive x-direction can thus be determined. In a preferred embodiment, the difference in light intensity measured by the object sensors is amplified to create an output voltage (in this case for the x-axis) that is proportional to the applied force (again, along the x-axis.)

In the case of a force applied only along the x-axis direction, the reflective object sensors 340 and 350 positioned along the y-axis will not move either toward or away from their respective inner walls 384 and 385, but only move in a direction parallel to the inner walls 384 and 385. In this way, the force sensing mechanisms along different axes are decoupled from each other, and force measurements along one axis can be made independent from forces along the other axis. Similarly, the reflective force sensors are not sensitive to and do not detect forces applied in the z-direction (upward or downward). For forces applied only in the z-direction, the sensors 320, 330, 340, and 350 measuring forces in the x- and y-axes will remain at the same distance from their respective inner surface 382, 383, 384, and 385 and their measurements therefore will not be effected. The exemplary preferred embodiment shown in FIG. 5 performs in an analogous manner for applied forces in the negative x-direction, or the positive and negative y-directions.

The optical sensor used for sensors 320, 330, 340, and 350 in FIG. 5 can be a commercially marketed and available integrated circuit device such as the OPB706A reflective sensor manufactured by QT Optoelectronics of Sunnyvale, Calif. Such a device will usually consist of an infrared light-emitting diode (LED, IRED) and a phototransistor (rather than a photodiode) integrated in a single package. The IRED provides the infrared light that is transmitted and reflected from the inner surfaces, while the phototransistor detects the emitted light that is reflected.

Figure 6:
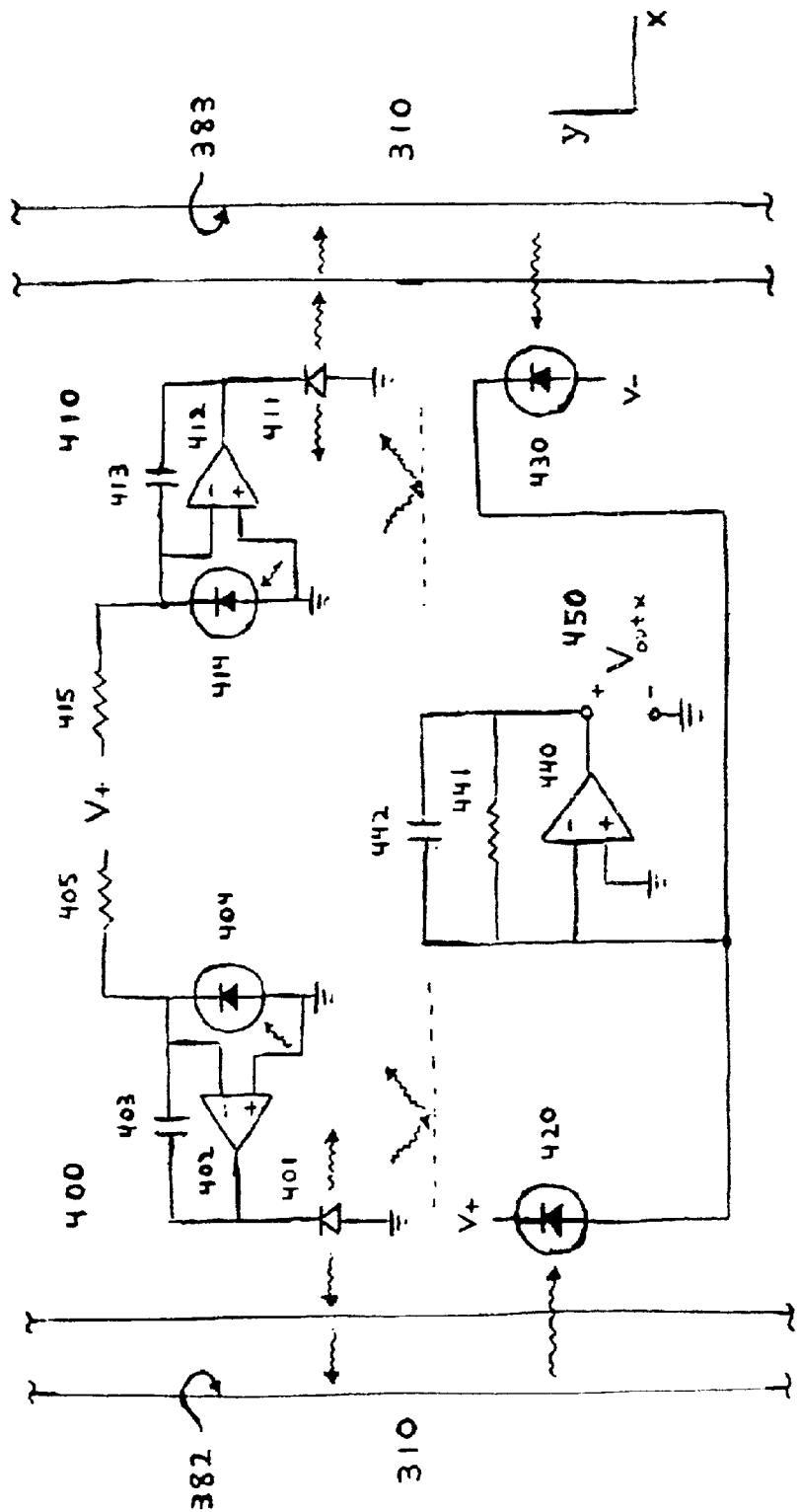
FIG. 6 is a diagram illustrating a optoelectronic sensor that can be utilized in the arrangement of sensors shown in FIG. 5.

Alternatively, FIG. 6 shows an exemplary embodiment of the optoelectronic two-axis force sensor using discrete components on the PCB 300 to implement the optical reflective object sensors used for sensors 320, 330, 340, and 350 in FIG. 5. In the preferred embodiment, discrete components can be utilized to implement the optoelectronic circuitry implementing the simplified circuit diagram illustrated in FIG. 6 in order to provide an output signal voltage that is proportional to the applied force applied along a particular axis (here the x-axis). Stabilizing circuits 400 and 410 provide stabilization of the current driven LEDs 401, 411 such that LEDs 401, 411 emit infrared light of substantially constant intensity. Infrared LEDs (IREDs) 401 and 411 are stabilized by optical feedback via respective operational amplifiers 402 and 412 (with capacitors 403 and 413) from respective photodiodes 404 and 414 and bias resistors 405 and 415. In this embodiment, Photodiodes 404 and 414 preferably monitor the light amplitude emitted by their respective IREDs 401 and 411 and accordingly adjusts the current injected to IREDs 401 and 411 to maintain consistent light output levels. In this manner, the current to the IRED (401 or 411) is kept substantially constant and the emitted light intensity is prevented from fluctuating substantially.

In this embodiment, symmetric configuration of sensors 320, 330, 340, and 350 are positioned on opposite sides of PCB 300 as shown in FIG. 5. It should be understood that in actual practice the configuration of sensors need not be symmetric as shown in these exemplary embodiments.

The emitted infrared light from IREDs 401 and 411 is incident on inner surfaces 382 and 383, respectively, and reflects back to be detected by photodiodes 420 and 430, respectively. When no forces are applied, the PCB 300 is preferably centered relative to the outer member 310, the photodiodes 420 and 430 are equally distant from their respective inner walls 382 and 383 and thus detect essentially the same amount of reflected light. The photocurrent through the photodiodes 420 and 430 is equivalent, and the voltage output by the operational amplifier 440 is effectively zero. As photodiode 420 moves away from its inner surface 382 and simultaneously photodiode 430 moves closer to its inner surface 383, the reflected light intensity detected by 420 will decrease while the reflected light intensity detected by 430 will increase, leading to an accompanying shift in the photocurrents and a corresponding change in the voltage output by the operational amplifier 440. Output circuitry 450 senses the difference in the photocurrents from photodiodes 420, 430 to output a voltage level proportional to the difference of the photocurrent that indicates the relative proximity of the photodiodes 420, 430 from the inner surfaces 382, 383.

In the illustrative embodiment, output circuitry 450 includes operational amplifier 440 with resistor 441 and capacitor 442 providing an output voltage $V_{out\ x}$. Resistor 441 and capacitor 442 provide parallel feedback of the output of the operational amplifier 440 back to the inverting terminal of the operational amplifier 440. Operational amplifier 440 thus amplifies the current difference of the photodiodes, thus providing an output voltage $V_{out\ x}$ that is approximately proportional to applied forces within the range allowed by the flexure 40.

Although FIG. 6 illustrates the optoelectronic circuitry for sensing forces along the x-axis, measurement of forces applied along the y-axis may be implemented in a similar manner. In that case, an output voltage $V_{out\ y}$ that is approximately proportional to applied forces within the range allowed by the flexure 40 is provided.

The optoelectronic elements used for the photodiodes 404, 414, 420, and 430 in FIG. 5 can be commercially marketed and available photodiodes such as the PN334 pin photo diode manufactured by Panasonic of Japan. The LN175 infrared LED, also manufactured by Panasonic, can be utilized as the IREDs 401 and 411 of FIG. 5.

As can be seen by those skilled in the art, the optoelectronic reflective force sensor and readout circuitry and technique shown in FIG. 5 and FIG. 6 can be applied to the preferred embodiment for the flexure 200 for a three-axis or three-dimensional force sensor shown in FIG. 4. Of course, the techniques and devices described herein can be used by those skilled in the art in a variety of other arrangements and embodiments.

Figure 7:
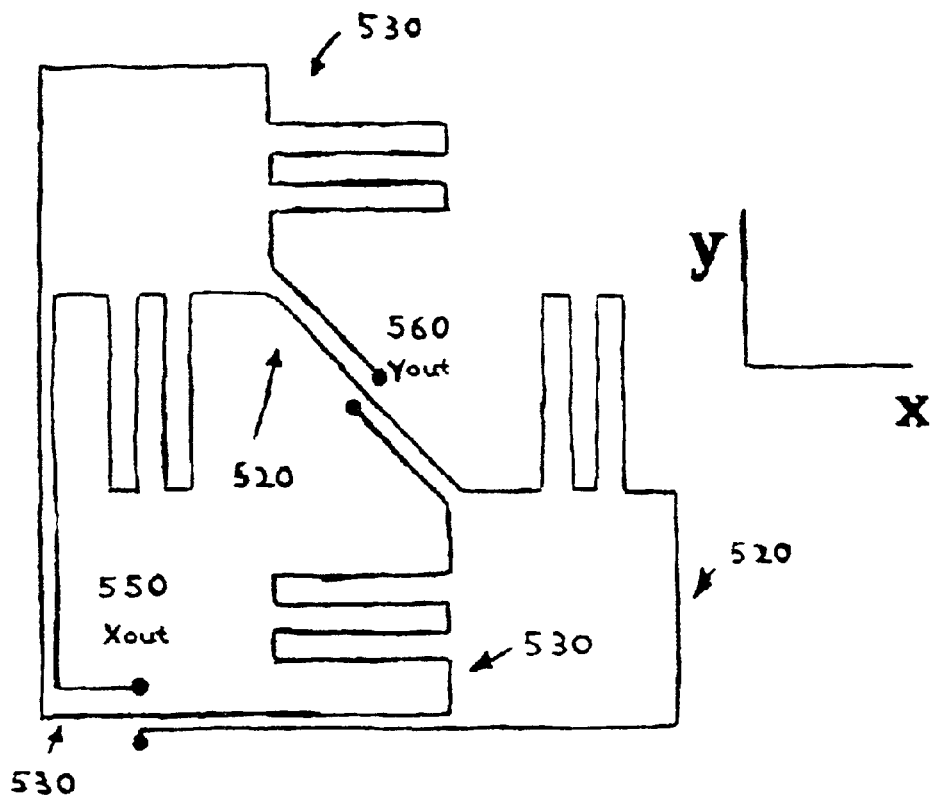
FIG. 7 is a diagram illustrating an inductive displacement measuring device that can be utilized with the embodiments of the invention.
Figure 7:
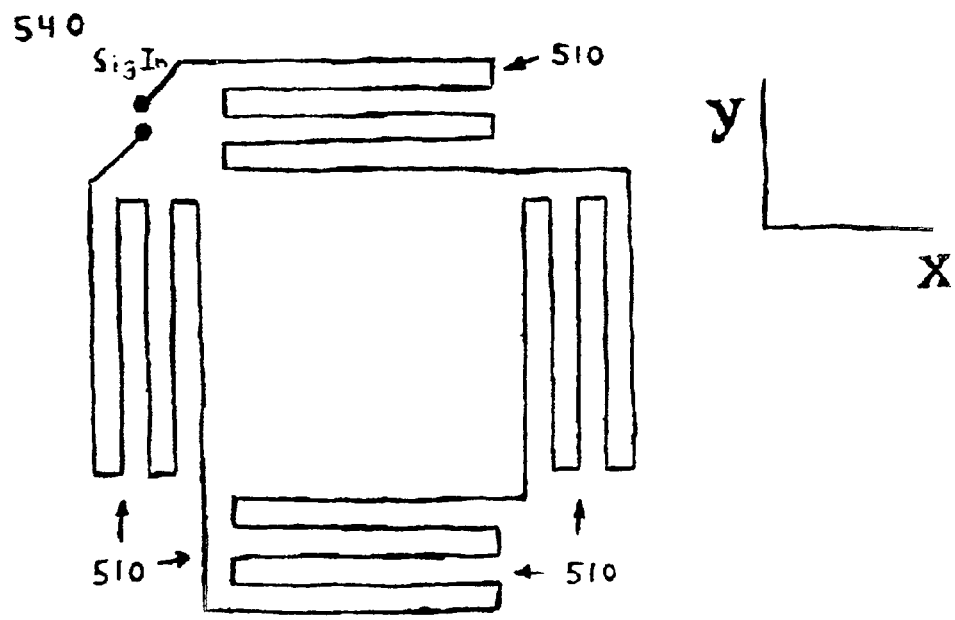

Referring now to FIG. 7, another embodiment employs an electromagnetic inductive readout technique to infer the applied force in the two-axis force sensor of FIG. 1 using the flexure 40 as described above. This embodiment uses induced voltages in a pattern of wires or traces to provide a non-contact inductive sensor that measures the displacement (controlled via the flexure 40) of the inner member 20 relative to the outer member 30. The measured displacement corresponds to the force applied to the handle 10.

FIG. 7 shows a simplified perspective view of three patterns of wires or traces 510, 520, 530, preferably fabricated on two separate but parallel positioned, non-contacting printed circuit board (PCBs) (not shown). In a preferred embodiment, two PCBs are mounted parallel to each other, one mounted on the base of an inner member (not shown) similar to inner member 20 of FIG. 1, and the other one mounted on an outer member (not shown) similar to outer member 30 of FIG. 1. The flexure 40 and the handle 10 are also not shown in FIG. 7 for purposes of clarity of explanation of the inductive sensor. One PCB is a transmitter PCB, containing a transmitter pattern of wires or traces 510 (lighter-shaded), while the other PCB contains two receiver patterns of wires or traces 520 and 530 (both darker-shaded), for measuring forces applied in the x and y directions, respectively. Either PCB can serve as the transmitter or the receiver.

The two PCBs do not make contact with each other and are parallel to and opposite from each other. The transmitter pattern of wires or traces 510 is thus opposite from and parallel to the two receiver patterns of wires or traces 520 and 530. That is, the two receiver patterns of wires or traces 520 and 530 lie in the same plane, while the transmitter pattern of wires or traces 510 lies in its own plane, parallel to receiver patterns 520 and 530. None of the patterns of wires or traces 510, 520 and 530 make electrical contact with each other.

An alternating current (AC) excitation signal is applied to the signal input 540 of the transmitter pattern of wires or traces 510. In a preferred embodiment, the signal frequency is 40 kHz, although the excitation signal is not limited to this frequency and can be any of a variety of frequencies. Excitation signal can be generated using circuitry such as described in U.S. application Ser. No. 09/246,826 and incorporated by reference herein can be used to provide an output voltage that is proportional to the applied force.

As in the case of the various embodiments of the optoelectronic force sensor, the measurements of the forces applied to the inductive force sensor are decoupled. The receiver pattern of wires or traces 520 outputs at the appropriate signal output 550 an output voltage $X_{out}$. This output voltage $X_{out}$ is then demodulated by a synchronous detector (not shown) yielding a direct current (DC) output signal that is proportional to forces applied along the x-axis, independent of force applied along the y-axis. The other receiver pattern of wires or traces 530 outputs at the appropriate signal output 560 an output voltage $Y_{out}$. This output voltage $Y_{out}$ is then demodulated by another synchronous detector (not shown) yielding a direct current (DC) output signal that is proportional to forces applied along the y-axis, while ignoring forces applied along the x-axis. Synchronous detection circuitry such as described in U.S. application Ser. No. 09/246,826 and incorporated by reference herein can be used to provide an output voltage that is proportional to the applied force.

When no force is applied to the handle 10 (not shown), the patterns of wires or traces are situated relative to each other so that no voltage is ultimately output. This is the state of the inductive two-axis force sensor shown in FIG. 7. When the inner member 20 moves relative to the outer member 30, voltages are induced in the traces, and an output voltage is produced at the appropriate signal output that, after demodulation, is proportional to the applied force along an axis. In effect, the motion of one PCB with respect to the other PCB is monitored and measured. As can be seen from the exemplary embodiment the arrangement and loops of patterns of wires or traces 510, 520, 530 are advantageously arranged to interact along the x and y-axis. As can be seen in the particular configuration of traces shown in FIG. 7, the traces are oriented perpendicular to each of the directions in which the applied force and resulting displacement are to be measured. It should be understood that many other arrangements of the patterns of wires or traces can be utilized to measure the force in the force sensor such circular, triangular, trapezoidal and even more arbitrary shapes, etc. Those of skill in the art can apply the teachings herein and devise the appropriate mechanisms suited to the particular geometry of the device.

Presented in Table 1 are experimental results for a two-axis force sensor employing optoelectronic reflection and force read-out techniques according to the exemplary embodiment. An exemplary embodiment of the optoelectronic two-axis force sensor as described above with reference to and illustrated in FIGS. 1, 2, 3, 5, and 6 may use a spring steel flexure similar to flexure 40 of FIG. 3. The following parameter values were used in accordance with the material selection analysis presented above in equations (6) through (11) for flexure 40 constructed of spring steel: a factor of safety =2, height or depth w=1.9 cm., full scale applied force F=66.3 lb., deflection in the y direction with F applied $y_d$=1 mm. These parameter values, in accordance with equation (10) imply a minimum value for the length L of the spring steel flexure 40 of $L_{min}$=4 cm. =1.6 in.

TABLE 1

Experimental Results For A Two-Axis Optoelectronic Force Sensor

| | |
|---|---|
| Maximum Deflection of the Force Sensor (In Either Direction) | 0.60 millimeters (mm) |
| Force Required to Achieve Maximum Deflection | 170 Newtons (N) |
| Sensitivity | 0.0018 Volts/N |
| Long Term Drift or Percentage of the Full Scale Force Subject to Drift in 24 Hours | 1.6 percent (%) |
| Short Term Drift or Percentage of the Full Scale Force Subject to Drift in 5 minutes | 0.23 percent (%) |

The maximum deflection of the two-axis sensor was 0.60 mm (in either direction). This required a force of 170 N. This is very close to the force expected from the theory, which is 177 N. All drift terms above are in terms of peak to peak measurement.

The long-term drift shown in Table 1 is the amount the measured force varies in 24 hours for a constant applied force, whereas the short-term drift is the amount the measured force varies in five minutes, and is much less than the long-term drift. For applications involving humans interacting with the sensor, forces tend to be applied for short periods of time. In preferred embodiments, the application of forces for short periods of time can be utilized, via filtering the recorded force, to increase the resolution of the force sensor being used.

Applied forces (and torques) in the z, $\tau_x$, $\tau_y$ and directions caused no measurable change in the measured force. A torque of 0.5 Nm in the $\tau_z$ direction did cause a measured force (9.8 N) in the x-y plane of less than ten percent of the maximum force.

Figure 8:
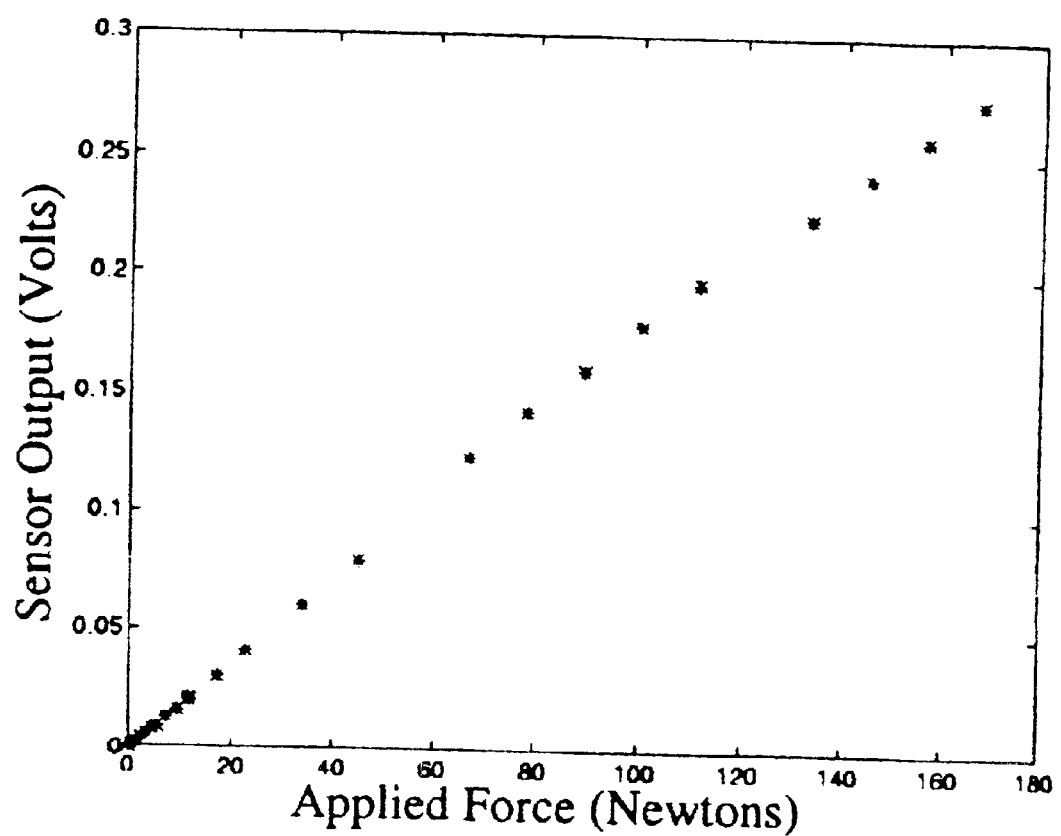
FIG. 8 is a x-y plot illustrating experimental results with respect to the applied force and the sensor output determined experimentally by use of a prototype two-axis optoelectronic force sensor.

FIG. 8 is a x-y plot illustrating preliminary experimental results with respect to the applied force and the sensor output in an exemplary embodiment of the two-axis optoelectronic force sensor. As those of skill in the art can observe by inspection of FIG. 8, the response (in terms of the sensor output voltage) of the force sensor to applied forces exhibits a linear relationship for relatively small forces. Larger forces on the order of the maximum force (~170 N) were not as linear. An applied force of 167 N, almost full scale, caused a measured force of 156N.

The results presented in Table 1 are preliminary in the sense that further experiments may be performed in the future. It should be understood that, as in any scientific research, changes or reconsideration with regard to the components selected, the materials used, the parameter values and ranges selected, the variables sought to be optimized, the objectives of the experimenters and the experiments designed to carry out those objectives, are to be expected, and the results are a reflection of assessments made at the time of the experiment. Any design or experimental decisions and considerations should be viewed in light of the narrow objectives holding sway at the time of the experiment. Future attempts at experimentation are expected to include attempts to increase sensitivity while reducing noise and drift levels in exemplary embodiments of the two-axis force sensor.

It should be understood that the programs, processes, methods, systems and apparatus described herein are not related or limited to any particular type of computer apparatus (hardware or software), unless indicated otherwise. Various types of general purpose or specialized computer apparatus may be used with or perform operations in accordance with the teachings described herein.

In view of the wide variety of embodiments to which the principles of the invention can be applied, it should be understood that the illustrated embodiments are exemplary only, and should not be taken as limiting the scope of the present invention. In addition, the present invention can be practiced with software, hardware, or a combination thereof.

The claims should not be read as limited to the described order or elements unless stated to that effect. Therefore, all embodiments that come within the scope and spirit of the following claims and equivalents thereto are claimed as the invention.

We claim:

1. A force sensor measuring applied forces, comprising:
    a first member;
    a second member, wherein the first member is positioned nearby to the second member;
    a flexure, the flexure connecting the first member to the second member, wherein the flexure supports the first member with respect to the second member and allows the first member to move relative to the second member substantially along two axes; and
    a readout mechanism measuring the displacement of the first member relative to the second member substantially along each of the two axes, wherein the applied forces are determined from the displacement of the first member relative to the second member.

2. The invention of claim 1 wherein the first member comprises an inner member and the second member comprises an outer member.

3. The invention of claim 1 wherein the readout mechanism comprises an optical electronic device.

4. The invention of claim 1 wherein the readout mechanism comprises an inductive readout device.

5. The invention of claim 1, further comprising:
    a graspable handle, the graspable handle connected to the first member.

6. The invention of claim 5 wherein the handle is integrally formed with the first member.

7. The invention of claim 1, further comprising:
    a printed circuit board comprising the readout mechanism, the printed circuit board positioned on one of the members and reading the relative displacement of the two members along each of the two axes.

8. The invention of claim 1 wherein the flexure comprises:
    a plurality of stripes of materials of substantially equal dimension, wherein the strips of materials are adapted to connect to each other to form the flexure.

9. The invention of claim 8 wherein the strips of material have an aspect ratio of approximately 30:1.

10. The invention of claim 8 wherein the strips of material are formed in an L-shape.

11. The invention of claim 1 wherein the material comprising the flexure comprises a plastic material.

12. The invention of claim 1 wherein the material comprising the flexure comprises a spring steel material.

13. A flexure capable of complying with applied forces, comprising:
    a first strip of material, and
    a second strip of material, wherein the first strip of material is adapted to connect to the second strip of material to form the flexure element, and the flexure element is connected to a first member and a second member to allow a relative displacement between the first member and the second member and the first and second strips of material having a width that is at least twice its thickness.

14. The invention of claim 13 wherein the first and second strips of material comprise substantially equal dimensions.

15. The flexure element of claim 13 wherein the first and second strips of material are formed into L-shaped strips of material.

16. The invention of claim 13 wherein the strips of material comprise a plastic material.

17. The invention of claim 13 wherein the strips of material comprise spring steel material.

18. The flexure of claim 13 wherein the dimensions of the strips of material determine the compliance of the flexure.

19. The invention of claim 13 wherein the width of the first strip of material is approximately 30 times the thickness of the first strip of material.

20. A force sensor measuring applied forces, comprising:
    a first member comprising a handle having a longitudinal axis disposed in a predetermined first position, the handle being movable substantially along two axes so as to displace said handle such that the longitudinal axis is spaced from and substantially parallel to the first position;
    a second member, wherein the first member is positioned nearby to the second member;
    a flexure disposed between the first member and the second member, and
    a readout mechanism operatively connected with the flexure and configured to measure the displacement of the first member relative to the second member substantially along each of the two axes, wherein the applied forces are determined from the displacement of the first member relative to the second member.

* * * * *

UNITED STATES PATENT AND TRADEMARK OFFICE
CERTIFICATE OF CORRECTION

PATENT NO. : 6,868,746 B1 Page 1 of 1
APPLICATION NO. : 09/307357
DATED : March 22, 2005
INVENTOR(S) : Michael A. Peshkin and Willam Andrew Lorenz It is certified that error appears in the above-identified patent and that said Letters Patent is hereby corrected as shown below:

Column 1, Line 3, Insert

--This invention was made with the support of the National Science Foundation (NSF), a federal government agency, through NSF Grant No. DMI 9634813.--

Signed and Sealed this

Twenty-second Day of January, 2008

JON W. DUDAS
*Director of the United States Patent and Trademark Office*